United States Patent [19]

Endo

[11] Patent Number: 4,981,351
[45] Date of Patent: Jan. 1, 1991

[54] FILM RETRIEVING APPARATUS

[75] Inventor: Makoto Endo, Tokyo, Japan

[73] Assignee: Canon Kabushiki Kaishi, Tokyo, Japan

[21] Appl. No.: 503,091

[22] Filed: Apr. 2, 1990

Related U.S. Application Data

[63] Continuation of Ser. No. 170,029, Mar. 22, 1988, abandoned, which is a continuation of Ser. No. 824,715, Jan. 31, 1986, abandoned.

[30] Foreign Application Priority Data

| Feb. 14, 1985 | [JP] | Japan | 60-027055 |
| Feb. 14, 1985 | [JP] | Japan | 60-027056 |
| Feb. 14, 1985 | [JP] | Japan | 60-027057 |
| Apr. 24, 1985 | [JP] | Japan | 60-087823 |
| Apr. 24, 1985 | [JP] | Japan | 60-087824 |

[51] Int. Cl.$^5$ .................................. G03B 23/08
[52] U.S. Cl. .................. 353/27 A; 353/26 A
[58] Field of Search ............ 353/25, 26 A, 26 R, 353/27 A, 27 R, 101, 95; 355/40, 41, 53; 250/570, 569

[56] References Cited

U.S. PATENT DOCUMENTS

| 2,358,106 | 9/1944 | Schubert | 353/95 |
| 3,582,203 | 6/1971 | Cox | 353/25 |
| 3,721,495 | 3/1973 | Tanaka | 355/41 |
| 4,016,406 | 4/1977 | Abe et al. | 353/26 A |
| 4,033,884 | 7/1977 | Toriumi et al. | 353/27 A |
| 4,160,169 | 7/1979 | Endicott et al. | 250/570 |
| 4,339,182 | 7/1982 | Ueda et al. | 353/27 R |
| 4,408,287 | 10/1983 | Parisot et al. | 353/27 A |
| 4,453,823 | 6/1984 | Sugita et al. | 353/26 A |
| 4,529,281 | 7/1985 | De Roche et al. | 353/27 A |
| 4,549,797 | 10/1985 | Sawanto et al. | 353/27 A |

FOREIGN PATENT DOCUMENTS

| 29390 | 5/1981 | European Pat. Off. | 353/27 A |
| 2335068 | 2/1974 | Fed. Rep. of Germany . |
| 2647831 | 4/1978 | Fed. Rep. of Germany . |
| 2545499 | 8/1984 | Fed. Rep. of Germany . |
| 883421 | 11/1961 | United Kingdom | 353/27 A |
| 1410539 | 10/1975 | United Kingdom . |

Primary Examiner—William A. Cuchlinski, Jr.
Attorney, Agent, or Firm—Fitzpatrick, Cella, Harper & Scinto

[57] ABSTRACT

A film retrieving apparatus for retrieving a desired frame in a film has an optical device for projecting images recorded in the frames of the film, a moving device for moving the film along a plane orthogonal to the optical path of the optical device, image detecting device for putting out a signal when it detects that no image is present in a frame, a control device for stopping the film when each frame of the film has been placed in the optical path of the optical device and for controlling the moving device so as to move the film in a set time after the stoppage of the film, and an inhibition device for inhibiting a frame in which no image is present from stopping in the optical path for the set time by the signal put out from the detecting device.

7 Claims, 9 Drawing Sheets

FILM RETRIEVING APPARATUS

This application is a continuation of application Ser. No. 170,029 filed Mar. 22, 1988, which is a continuation of application Ser. No. 824,715 filed Jan. 31, 1986, both now abandoned.

BACKGROUND OF THE INVENTION

1. Field of the Invention

This invention relates to a film retrieving apparatus for retrieving images recorded in the frames of a film such as a microfiche.

2. Description of the Prior Art

In a reader or the like wherein an image recorded in each frame of a microfilm such as a microfiche or a film jacket is projected onto a screen and read, use is made of a retrieving apparatus in which a card-like film such as a microfiche is carried on a carrier table, which is driven by an electric moving mechanism to thereby move a desired frame to the projecting position. The retrieving apparatus of this type has the function of automatically moving a designated frame to the projecting position or moving frames one by one to the projecting position, by operating a keyboard.

In a retrieving apparatus having the function of effecting the browsing retrieval in which the image of each frame is read by repeating the operation of moving frames in succession to the projecting position, stopping the frame at the projecting position for a predetermined time, and thereafter moving the microfilm to thereby move the next frame to the projecting position, if a film having a frame in which no image is recorded (hereinafter referred to as the blank frame) is used, the blank frame is stopped at the projecting position for the predetermined time. Thus, this blank frame is projected onto the screen for the predetermined time and the user wastes time until the next image is retrieved. Particularly, where a number of blank frames are present in the microfilm, wasteful work is done for a long time, and this has led to the problem of poor working efficiency. Also, where the blank frame is transparent, if this blank frame is projected onto the screen, the screen becomes very bright, and this has led to the problem that the user's eyes are fatigued.

Now, in some card-like microfilms such as microfiches or film jackets, there are slight deviations of the positions of frames or in some cases, the necessity of projecting a particular portion of the film such as a portion extending over two frames arises, and for this reason, the above-described retrieving apparatus is endowed with the fine position adjusting function for slightly moving the position of the film to thereby obtain a desired projection image.

There are the following two types of fine frame position adjusting mechanism of the film retrieving apparatus of this type:

(a) The type is which a carrier table carrying a film thereon is manually moved to accomplish fine adjustment; and (b) The type in which a key for fine adjustment is provided on a keyboard for effecting the operation of moving a carrier table carrying a film thereon and by operating this key for fine adjustment, the carrier table is slowly moved in a vertical direction or a horizontal direction by an electric moving mechanism to thereby accomplish fine adjustment.

However, such prior art has the following problems: The case of the manual movement of item (a) above:

Rotating and sliding mechanisms for fine adjustment are required, and this leads to complexity of the entire mechanism. The manual operation permits the speed of movement of the carrier table to be adjusted as desired, but where a frame of a film of great information reduction rate is projected onto the screen by the use of a lens of high magnification, the image on the screen moves greatly under the influence of hand vibration and therefore, fine adjustment is difficult and requires skill. Also, the image reduction rate differs from film to film and correspondingly, the film form such as the number of frames in a film differs from film to film and therefore, where a film of the film form having a high reduction rate and a great number of frames is to be projected, it is necessary to use a lens of high magnification. In such case, the image on the screen moves greatly under the influence of hand vibration and therefore, fine adjustment is difficult and requires skill. The case of the electric operation of item (b) above:

While the key for fine adjustment is depressed, the carrier table is moved in a vertical direction or a horizontal direction, and when the key is released, the carrier table is stopped and therefore, anybody can easily operate the apparatus, but since the carrier table is moved at a predetermined speed independently of the magnification of the projection lens, the speed of movement of the image on the screen differs depending on the magnification of the projection lens. Accordingly, to project of film of the film form having a high reduction rate or a great number of frames, it is necessary to use a lens of high magnification, and in such a case, the speed of movement of the image on the screen becomes high and alignment of each frame is difficult and also, if the retrieving work is done for a long time, the user's eyes become fatigued or the user sometimes comes to feel as if he were seasick. Conversely, to project a card-like film of the film form having a low reduction rate or a small number of frames, use is made of a lens of low magnification, and in such case, the speed of movement of the image on the screen becomes low and therefore, the adjustment of the position of the frame requires a long time.

SUMMARY OF THE INVENTION

The present invention has been made in order to solve the above-noted problems peculiar to the prior art and an object thereof is to provide a film retrieving apparatus which shortens the retrieval time and eliminates wasteful time.

Another object of the present invention is to provide a film retrieving apparatus which enables the speed of movement of a film during fine adjustment of the frame position to be freely adjusted, thereby reducing the user's fatigue during retrieval and making the apparatus easy to use.

Still another object of the present invention is to provide a film retrieving apparatus in which the speeds of movement of carrier tables are controlled by the form of a film so that the speed of movement of the image on a screen during fine adjustment is substantially constant irrespective of the projection magnification, the form of the film, etc., whereby during the fine adjustment of the positional movement of the film, alignment of a frame can be accomplished with ease, within a short time, and independently of the magnification of a projection lens and the fatigue of the user's eyes and the phenomenon of seasickness can be prevented.

DESCRIPTION OF THE PREFERRED EMBODIMENTS

Figure 1:
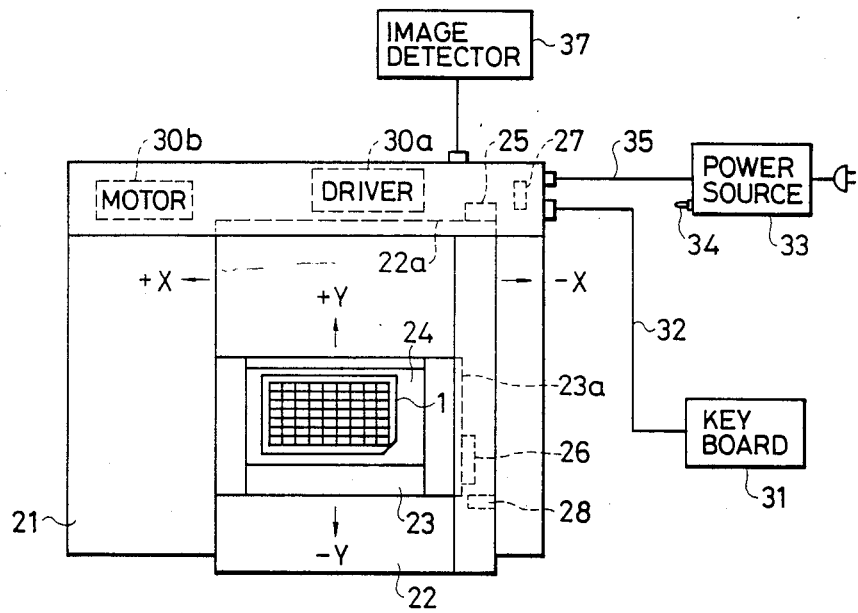
FIG. 1 schematically shows the construction of a microfiche retrieving apparatus to which the present invention is applied.

FIG. 1 is a view of a microfiche retrieving apparatus according to an embodiment of the present invention as seen from above it. An X-direction carrier table 22 slidable in X-direction rests on a carrier bed 21, and a Y-direction carrier table 23 slidable in Y-direction rests on the X-direction carrier table 22. A transparent member 24 carrying a microfiche thereon rests on the Y-direction carrier table 23, and when the Y-direction carrier table is moved in -Y-direction, the transparent member 24 may pivot about its rear end from a certain point and the forward end thereof may move upwardly to begin to open, and when it has fully come to this side, it may assume its fully open state. (It is assumed that the position in which this open state is assumed is an eject position.) At this time, the operator can interchange, take out or insert the microfiche.

An X-direction reference position detecting member 25 is coupled to the X-direction carrier table 22 and is disposed so as to detect the X-direction reference position by means of an X-direction sensor 27. Likewise, a Y-direction reference position detecting member 26 is coupled to the Y-direction carrier table 23 and is disposed so as to detect the Y-direction reference position by means of a Y-direction sensor 28.

Figure 2:
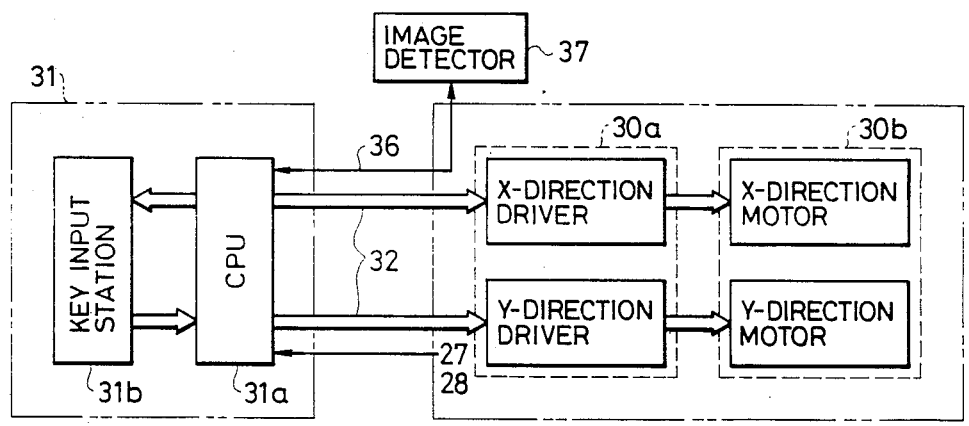
FIG. 2 is a block diagram of the circuit of the retrieving apparatus of FIG. 1.

A driver 30a and the signal systems of the X-direction sensor 27 and the Y-direction sensor 28 are connected to a CPU board 31a in a keyboard 31 through a cable 32 (FIG. 2). The DC output voltage from a power source unit 33 is supplied to the driver 30a, the X-direction sensor 27 and the Y-direction sensor 28 in the carrier through a cable 35, and the output voltage from the power source unit 33 is supplied to the CPU board 31a in the keyboard 31 through the cable 32. The power source unit 33 is provided with a power source switch 34 for switching on and off the supply of voltage to various portions. The driver 30a and an X, Y-direction motor (pulse motor) 30b are connected together and are controlled by a pulse and a direction change-over signal supplied from the CPU board 31a.

The CPU board 31a in the keyboard 31 and an image detector 37 are connected together through a cable 36. The image detector 37 detects the presence or absence of an image in each frame of the microfiche and inputs the detection signal to the CPU board 31a. The image detector 37, as shown in FIG. 3, has a sensor 37a for receiving a light transmitted through the microfiche.

Figure 3:
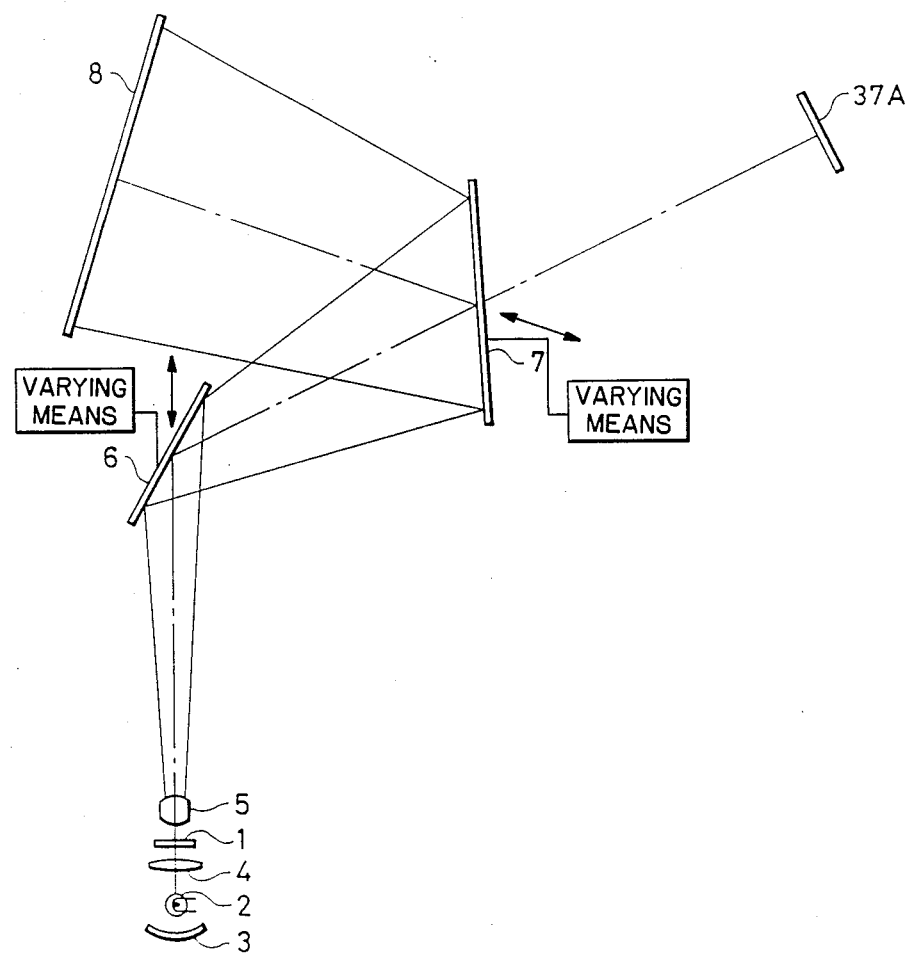
FIG. 3 shows the construction of a sensor for detecting the presence or absence of an image.

In FIG. 3, reference numeral 1 designates the microfiche (hereinafter referred to as the film) on the Y-direction carrier table 23. The film 1 is illuminated by an illuminating device comprising an illuminating lamp 2, a spherical reflecting mirror 3 and a condensing lens 4. The entire image recorded in each frame of the film 1 is projected onto a screen 8 by a projection lens 5 through a fixed mirror (reflecting member) 6 and a half-mirror (half-transmitting reflecting member) 7 disposed at predetermined positions. The optical path may be changed by moving otherwise fixed mirror 6 or half-mirror 7 as shown in FIG. 3 along the optical axis. A sensor 37A is disposed behind the half-mirror 7 at a position equal to the length of the optical path from the film to the screen 8. The sensor 37A comprises one or more photoelectric converting elements such as CdS. Part of the projected light is projected onto the sensor 37A.

Figures 4, 5:
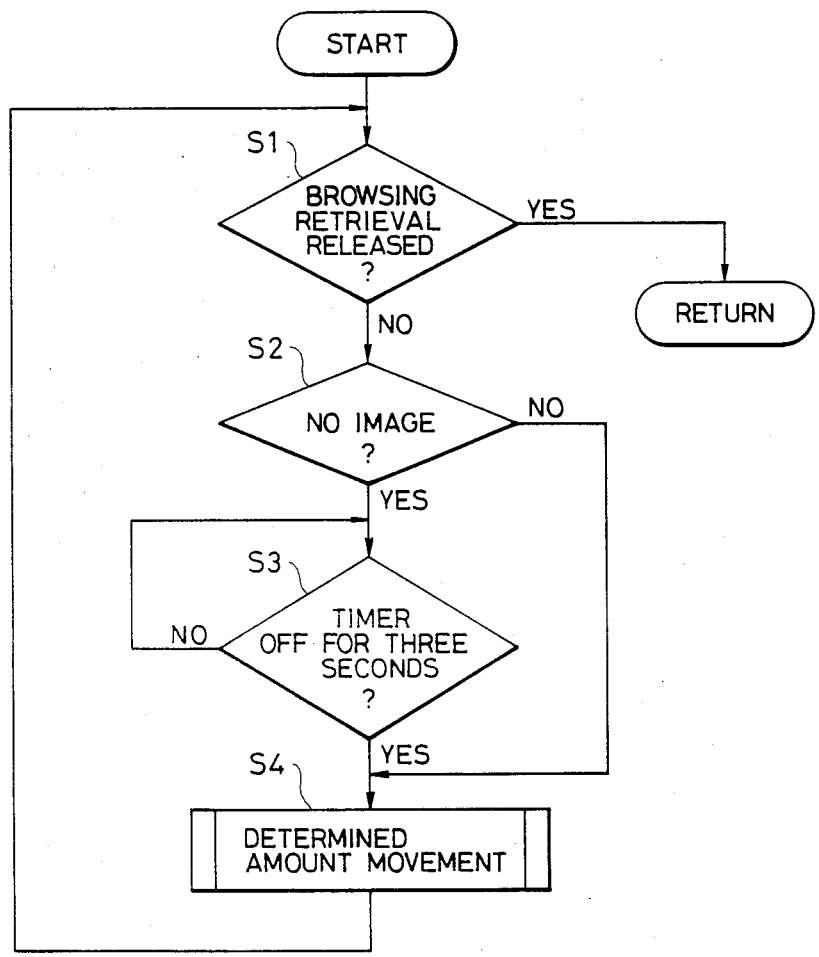
FIG. 4 is a block diagram of an image detector for detecting the presence or absence of an image.
FIGS. 5 and 6 are flow charts of the retrieving operation.

FIG. 4 is a block diagram of the image detector 37 for processing the output signal of the sensor 37A and detecting the presence or absence of an image in each frame of the film. The output signal of the sensor 37A is amplified by an amplifier 16, whereafter it is compared with a comparison voltage Vr by a comparator 17, and by the magnitudes of the two voltages being thus compared, the presence or absence of an image can be discriminated, and the output of the comparator 17 is input to the CPU board 31a. The comparison voltage Vr is of a predetermined voltage value predetermined by the output voltages of the amplifier 16 when the image is present and when the image is absent.

Figure 10:
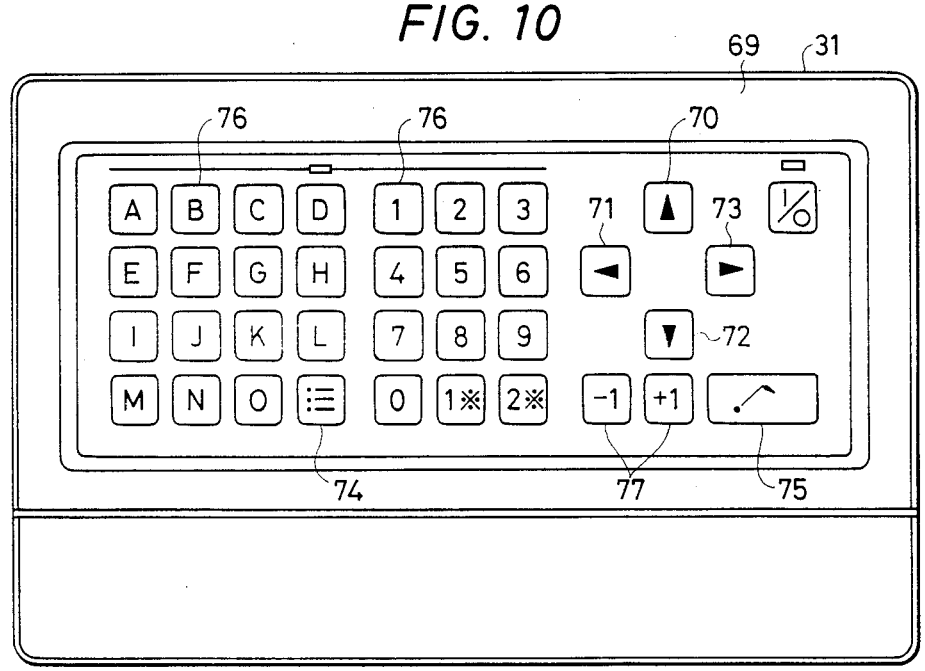
FIG. 10 is a plan view showing a keyboard.

Referring now to FIG. 10 which shows the keyboard 31, various keys as frame designating means are provided on the panel surface 69 of the keyboard. Reference numerals 70–73 designate frame position fine adjustment keys. By the fine adjustment keys 70–73 being depressed, a signal is put out from the CPU 31a to the driver 30a so that the X-direction carrier table 22 or the Y-direction carrier table 23 is slightly moved in the direction opposite to the direction of arrow. In addition to the fine adjustment keys, an index key 74, an eject key 75, an address designating key 76, and +1 and −1 keys 77 are provided on the panel surface 69.

In the construction as described above, when the power source switch is closed, the X-direction carrier table 22 and the Y-direction carrier table 23 are moved to their respective reference positions. The directions of movement of these carrier tables are discriminated by whether the X-direction reference position detecting member 25 and the Y-direction reference position detecting member 26 have been detected by the X-direction sensor 27 and the Y-direction sensor 28, respectively. For example, assuming that the carrier tables are in the state as shown in FIG. 1 when the power source switch is closed, the X-direction and Y-direction sensors 27 and 28 do not detect the X-direction and Y-direction reference position detecting members 25 and 26, respectively, and therefore, the carrier tables 22 and 23 are moved in -X-direction and -Y-direction, respectively, and the movement of the carrier tables 22 and 23 is stopped when the sensors 27 and 28 have detected the detecting members 25 and 26, respectively. When the carrier is moved to its reference position in this manner, it receives the input from the keyboard 31. The eject key 75 is first operated to move the carrier to the eject position, and in the eject position, the film 1 is inserted. Subsequently, when the index key 74 or the address designating key 76 is depressed, the carrier is moved and the index frame or the address-designated desired frame in the film 1 is retrieved, and this frame is placed at the projecting position and stopped thereat.

When the +1 or -1 key 77 is depressed for two or more seconds, the browsing retrieval mode is assumed. The +1 key is continuously depressed for two or more seconds when the carrier is to be moved in +X-direction or +Y-direction to effect browsing retrieval, and the -1 key is continuously depressed for two or more seconds when the carrier is to be moved in -X-direction or -Y-direction to effect browsing retrieval. When the mode is set to the browsing retrieval mode, the carrier is moved in a predetermined direction and, when the film is fed by a predetermined length (the sum of the length of the frame in the direction of movement of the film and the length of the non-image portion between frames), the carrier is stopped and the frame next to the index frame or the retrieved desired frame is stopped at the projecting position for a set time, and after the lapse of the set time, the carrier is again moved in the predetermined direction to thereby feed the film by a predetermined amount, and the next frame is stopped at the projecting position for the set time, whereafter the above-described operation is automatically repeated. For example, assuming that when the carrier is moved in the direction of column (left to right direction) to effect browsing retrieval, images are recorded in all frames of each line, the carrier is moved so that the frames of each line from the leftmost frame to the rightmost frame of the film are placed at the projecting position for the set time. If a blank frame is detected in the course of retrieval and a no-image signal is sent from the image detector 37, the carrier is moved so that the blank frame is not stopped at the projecting position but the frame next to this blank frame is placed at the projecting position. That is, when the image detector 37 has detected a blank frame, this blank frame is inhibited from being stopped at the projecting position and the carrier is continuedly moved by a predetermined amount and, when the next frame has been placed at the projecting position, the inhibition is released if an image frame is detected, and said image frame is stopped at the projecting position for the set time.

FIG. 5 shows the flow chart of the abovedescribed operation. At step S1, whether the browsing retrieval has been released is examined and if the browsing retrieval is released, the mode goes out of the browsing retrieval mode, and if not so, the program proceeds to step S2. At step S2, if the image detector 37 puts out a no-image signal (the image detector 37 detects a non-image frame) when the carrier has been moved by a predetermined amount, the program proceeds to step S4, and if the image detector 37 puts out an image-presence signal (the image detector 37 detects an image frame), the program proceeds to step S3. At step S3, a timer is set to three seconds and the carrier is stopped for three seconds. After the termination of the timer operation, the program proceeds to step S4. At step S4, a pulse corresponding to a predetermined amount of movement is sent to the driver 30a and the direction of feeding is judged by which of the +1 key or the -1 key has been operated, and the carrier is fed by a predetermined amount in a predetermined direction and the next frame is placed at the projecting position. After the termination of step S4, the program returns to step S1. Thereafter, steps S1-S4 are repeated until the browsing retrieval is released.

Accordingly, when the image detector 37 has detected a blank frame, each blank frame in this line or column is not stopped at the projecting position for a set time and therefore, time is not wasted, and if a number of blank frames are present in the film, the browsing retrieval time can be greatly shortened.

The sensor 37A detects the light from a frame during the movement of the carrier immediately before each frame is placed at the predetermined projecting position. Design may also be made such that when the image detector 37 has detected a blank frame, the carrier is stopped for a short time (shorter than the time during which the carrier is stopped when an image is present) and then the carrier is again moved.

While, in the above-described embodiment, the browsing retrieval mode is assumed when the +1 or -1 key is continuously depressed for two seconds, a key exclusively for use for commanding the browsing retrievel mode may be provided. Also, the frame stop time during the browsing retrieval may be varied as desired.

In the above-described embodiment, the comparison voltage Vr of the comparator is given a predetermined value, but if design is made such that the comparison voltage Vr is controlled depending on the conditions such as lens magnification, etc., detection of the presence or absence of an image can also be accurately accomplished by interchange of the lens.

The position at which the sensor 37A is disposed is not restricted to the position shown in the embodiment, but the sensor 37A may be disposed at any position whereat the presence or absence of an image can be detected.

As described above, according to the present invention, in the film browsing retrieval mode, when a blank frame having no image therein has been detected, the carrier is moved so that this blank frame is not stopped at the projecting position for the set time but the next frame is placed at the projecting position, whereby waste of the retrieval time can be eliminated and also, the adverse effect that a frame having no image therein is projected onto the screen and the screen is so bright for the set time as to fatigue the operator's eye can be eliminated.

Figure 6:
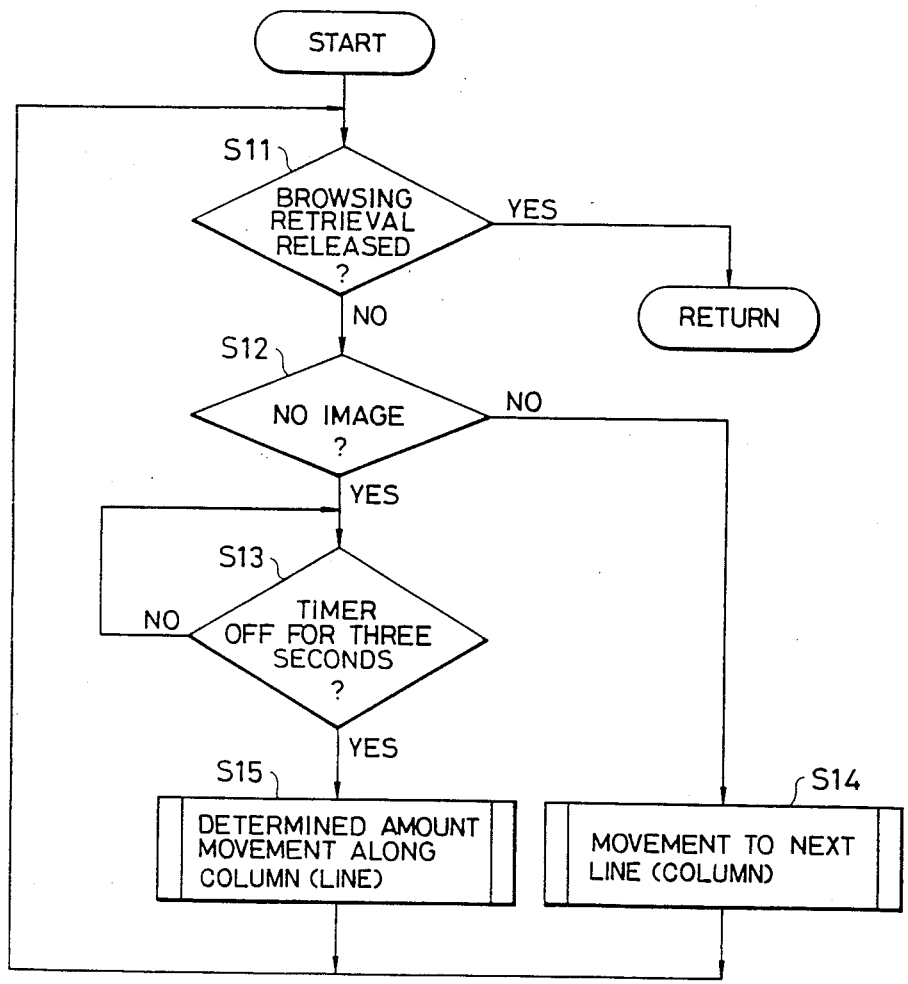

FIG. 6 shows the flow chart of another example of the browsing retrieval. When a no-image signal has been sent from the image detector 37 during the browsing retrieval, the carrier is moved so that the blank frame is not stopped at the projecting position but the frame at the top address in the next line is placed at the projecting position. That is, when the image detector 37 has detected a blank frame, this blank frame is not stopped at the projecting position for the set time, but the carrier is moved so that the top frame in the next line is placed at the projecting position.

In FIG. 6, at step S11, whether the browsing retrieval has been released is examined, and if the browsing retrieval is released, the mode goes out of the browsing retrieval mode, and if not so, the program proceeds to step S12. At step S12, if the image detector 37 puts out a no-image signal when a frame has been placed at the projecting position, the program proceeds to step S14, and if the image detector 37 puts out an image-presence signal, the program proceeds to step S13. At step S13, the timer is set to three seconds and the carrier is stopped for three seconds. After the termination of the timer operation, the program proceeds to step S15. At step S15, a pulse corresponding to a predetermined amount of movement is sent to the driver 30a and the direction of feeding is judged by which of the +1 key or the −1 key has been operated, and the carrier is fed by a predetermined amount in a predetermined direction and the next frame is placed at the projecting position. After the termination of step S15, the program returns to step S11. Also, at step S14, a pulse for moving to the next line (or column) is sent to the driver 30a and the carrier is moved in the direction determined by the operation of the +1 key or the −1 key, and the first frame in the next line or column is placed at the projecting position. Thereafter, steps S11–S14 or steps S11–S13 and S15 are repeated until the browsing retrieval is released.

Accordingly, when the image detector 37 has detected a blank frame, each blank frame in this line or column is not stopped and projected at the projecting position for the set time and therefore, time is not wasted, and if a number of blank frames are present in the film, the browsing retrieval time can be greatly shortened.

Figure 7:
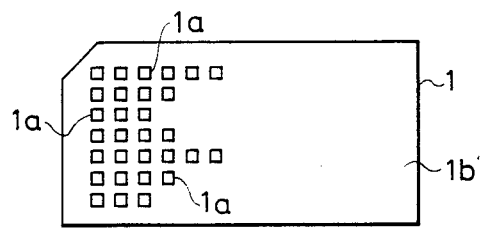
FIG. 7 is a front view of a microfiche film.

Referring now to FIG. 7 which shows the microfiche 1, reference character 1a designates frames in which images are recorded, and reference character 1b denotes a blank portion in which no image is recorded. Since no image is recorded in each frame in this blank portion 1b, the frames in the blank portion are of the same density as the marginal portions (base portions) of the frames 1a.

Figure 9:
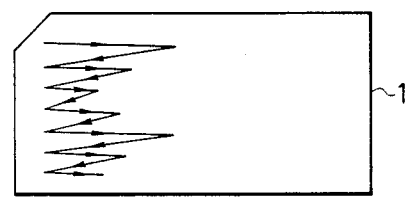
FIGS. 8 and 9 illustrate the order in which the frames of the microfiche film are projected.
Figure 8:
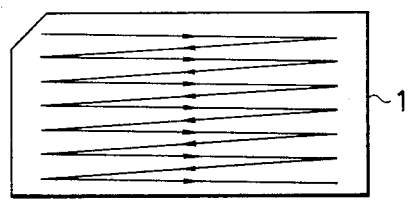

FIG. 8 shows a case where browsing retrieval has been effected by the use of a microfiche in all frames of which images are recorded, and the frames are placed at the projecting position in the order indicated by arrows FIG. 9 shows a case where browsing retrieval has been effected by the use of a microfiche in some frames of which images are recorded, i.e., a film having blank frames therein, and frames having images are placed only in the areas indicated by arrows, and all of the frames having images are placed at the projecting position in the order indicated by arrows.

Also, in the above-described embodiment, where a blank frame has come in the last line (or column), if an index frame in which an index is recorded is placed at the projecting position, retrieval can be completed without the blank frame being projected for a long time.

The position at which the sensor 37A is disposed is not restricted to the position shown in the embodiment, but the sensor 37A may be disposed at any position whereat the presence or absence of an image can be detected.

As described above, according to the present invention, in the film browsing retrieval mode, if a blank frame having no image is detected, the carrier is moved to the next column in the case of the line direction retrieval and to the next line in the case of the column direction retrieval, whereby waste of the retrieval time can be eliminated, and also, the adverse effect that the screen suddenly becomes bright by a frame having no image to fatigue the operator's eyes can be eliminated.

As means for detecting the presence of a blank frame, a rectangular mark different in density from the surroundings thereof may be provided in the film correspondingly to the blank frame, and by detecting the presence or absence of this mark, the presence or absence of an image in a frame may be detected.

Figure 11:
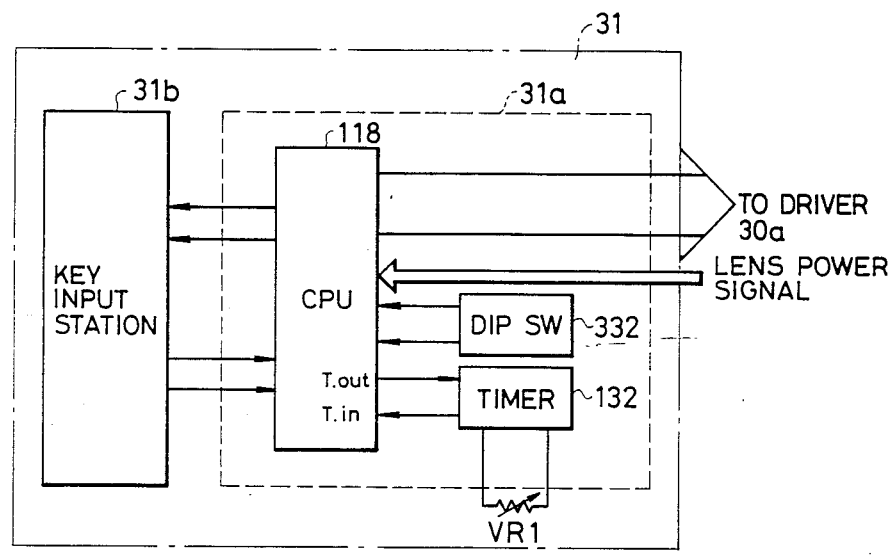
FIG. 11 is a block diagram of the keyboard.

Referring to FIG. 11, which is a block diagram of the keyboard, there is in the CPU board 31a a microcomputer (hereinafter referred to as the CPU) 118 which effects the outputting of a driving signal to a key scan and a pulse motor and inputting of a speed signal or the like from fine speed setting means 132 which will later be described. The key input station 31b is provided with the various keys 70, 71, . . . which are connected to the CPU 118.

Figure 12:
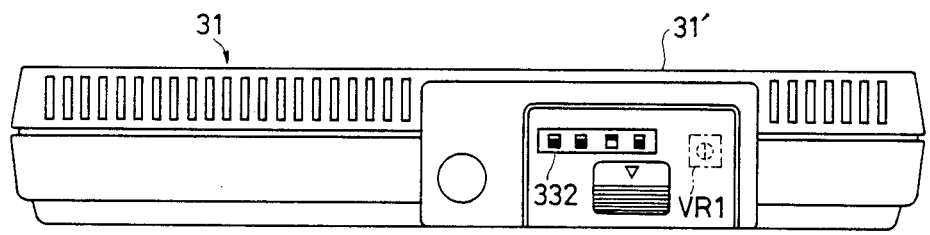
FIG. 12 is a back view of the keyboard.
Figure 13:
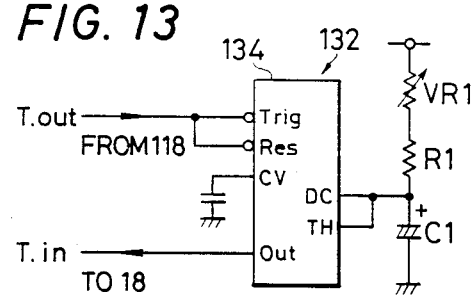
FIG. 13 is a circuit diagram showing fine speed setting means.

Further, the keyboard 31 is provided with the fine speed setting means 132 for setting the speeds of movement of the X-direction and the Y-direction carrier tables 22 and 23 during fine adjustment. This fine speed setting means 132 comprises a timer connected to the CPU 118. The timer 132, as shown in FIG. 13, comprises a timer IC134, a resistor R1, a capacitor C1 and a variable resistor VR1. The variable resistor VR1 is adjustably mounted on the back of the case 31' of the keyboard 31, as shown in FIG. 12, and cooperates with the resistor R1 and the capacitor C1 to vary the set time (time constant) of the timer IC134. The timer 132 resets the timer IC134 by the output from the CPU 118, and puts out a pulse (speed signal) from the timer IC134 to the CPU118 after said timer set time. In the CPU 118, operation processing is effected in accordance with a pre-incorporated program on the basis of the speed signal from the timer 132, and the driving pulse put out from the CPU 118 to the driver 30a is adjusted, whereby the speeds of movement of the X-direction carrier table 22 and the Y-direction carrier table 23 during the operation of the fine adjustment keys 70–73 are controlled.

In the above-described construction, when the X-direction and Y-direction carrier tables 22 and 23 are moved to their reference positions, they receive an input from the keyboard 31. (At this time, however, the fine adjustment keys 70–73 and the +1 and −1 keys 77 do not receive the input.) In this state, when, for example, the "9" address designating key is depressed, the 9th column of the film 1 is moved to the projecting position at a relatively high speed, and when the "E" address designating key is depressed, the Eth line of the film 1 is moved to the projecting position at a relatively high speed, and finally the frame on the 9th column and the Eth line of the film 1 is moved to the projecting position.

When the fine adjustment keys 70–73 are depressed after this movement, the X-direction carrier table 22 or the Y-direction carrier table 23 is moved at a speed lower than said speed in the direction opposite to the direction of each arrow (but the image on the screen moves in the same direction as the direction of arrow when the film 1 is projected onto the screen). The speed of this movement is controlled in the following manner by the CPU 118 serving also as fine speed control means on the basis of the speed signal from the fine speed setting means 132.

Figure 14A:
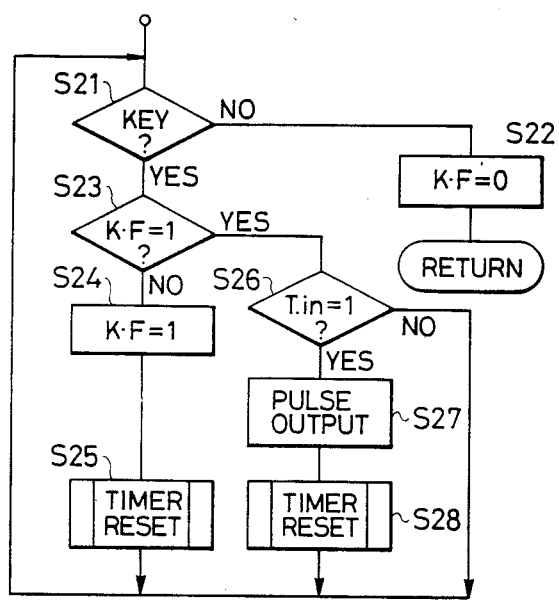
FIG. 14A is a flow chart showing the program executed by the CPU of the keyboard.
Figure 14B:
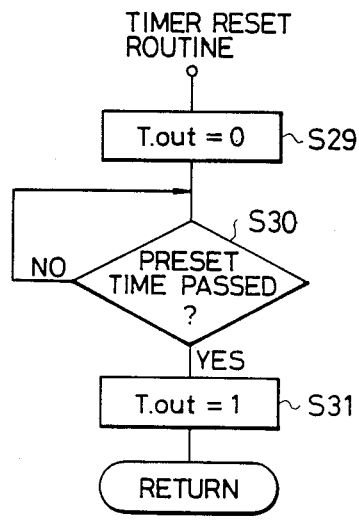
FIG. 14B is a flow chart showing the timer reset routine of the flow chart of FIG. 14A.

That is, the CPU 118, as shown in FIG. 14, first judges whether the fine adjustment keys 70-73 have been depressed (step S21), and if those keys are not depressed, the CPU 118 clears a key flag K.F and returns (step S22). If the fine adjustment keys 70-73 have been depressed, the CPU 118 judges whether the key flag K.F is 1 (step S23), and in this case, K.F=0 and therefore, the CPU 118 sets the key flag to K.F=1 (step S24). Subsequently, timer resetting is effected (step S25). The timer reset routine, as shown in FIG. 14B, is such that the output T.OUT to the timer IC134 is rendered into T.OUT=0 (step S29), and after the waiting for a predetermined time in the software timer in the CPU 118 (step S30), the output T.OUT is rendered into T.OUT=1 (step S31). Then, the program returns to step S21, but if the fine adjustment keys remain depressed, the program proceeds to step S23. At this time, K.F=1 and therefore, the program proceeds to step S26. At this step, it is judged whether T.IN, i.e., the output from the timer IC134, is 1, but since T.IN=0 before the set time of the timer IC134 elapses, the program returns to step S21. When the set time of the timer IC134 elapses after step S21→step S23→step S26→step S21 have been repeated several times, T.IN becomes T.IN=1 and therefore, only at this time, the program proceeds to step S27. At this step, a driving pulse is put out from the CPU 118 to the driver 30a to move the X-direction carrier table 22 or the Y-direction carrier table 23 in the direction input by the fine adjustment keys. After the timer is reset (step S28), step S21→step S23→step S26→step S21 are again repeated until the set time of the timer IC134 elapses, and after the lapse of a predetermined time, a driving pulse is put out from the CPU 118. Thus, while the fine adjustment keys 70-73 are depressed, the X-direction carrier table 22 or the Y-direction carrier table 23 is moved in a predetermined direction at a speed of movement determined by the interval of the driving pulse put out from the CPU 118 to the driver 30a as described above. This speed of movement, i.e., the interval of the driving pulse, is determined by the variable resistor VR1 which varies the set time of the timer IC134.

When the fine adjustment keys 70-73 are depressed as described above, the CPU 118 effects program processing by the signal from the fine speed setting means 132 whose fine speed is preset by the variable resistor VR1, and adjusts the interval of the driving pulse put out to the driver 30a, and controls the speeds of movement of the X-direction carrier table 22 and the Y-direction carrier table 23 during fine adjustment to the speeds of movement set by the fine speed setting means 132.

Further, by depressing the +1 and −1 keys 77, it is possible to move the film by one frame each, and by depressing the eject key 75, it is of course possible to move the Y-direction carrier table 23 to the eject position, open the transparent member 24, take out and interchange the film.

In the embodiment shown, the variable resistor VR1 of the fine speed setting means 132 has been described as being mounted on the back of the case 135 of the keyboard 31, but alternatively, this variable resistor VR1 may be provided on the panel 69 of the keyboard 31 or may be provided at any location if the knob of the variable resistor VR1 is adjustable from outside.

Figure 15:
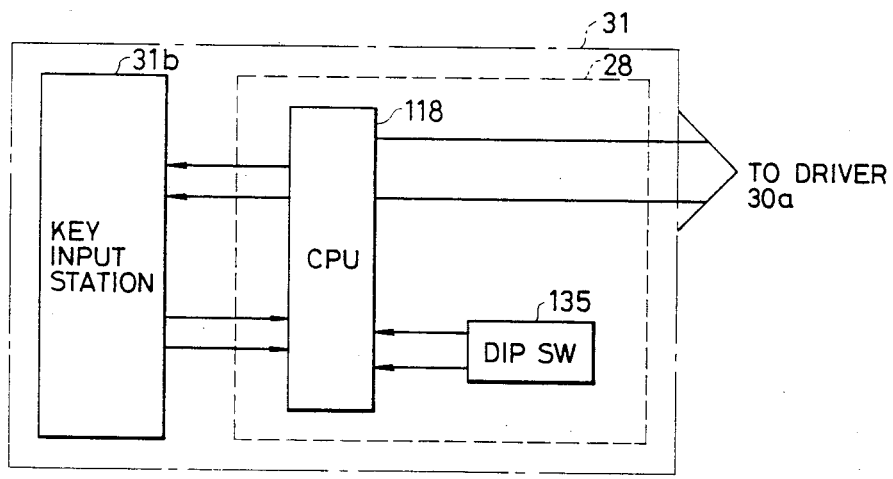
FIG. 15 is a block diagram showing another embodiment of the keyboard.

Also, in the embodiment shown, the fine speed setting means 132 has been described as being comprised of a timer, whereas this is not restrictive, but the fine speed setting means 132 may be comprised of a dip switch 135, as shown in FIG. 15. In this case, the speed of movement during fine adjustment is set by the dip switch 135, program processing is effected in the CPU 118 in accordance with a digital signal put out from the dip switch 135, and control of the fine speed is effected by the signal from the CPU 118.

Further, a speed setting key may be provided on the panel 69 of the keyboard 31 and this speed setting key may be used as the fine speed setting means 132.

Also, the embodiment shown has been described with respect to a case where the interval of the driving pulse put out from the CPU 118 to the driver 30a is adjusted by the signal from the fine speed setting means 132, whereby the speeds of movement of the X-direction and Y-direction carrier tables 22 and 23 during fine adjustment are controlled, but alternatively, design may be made such that the CPU 118 is operated by the signal from the fine speed setting means 132 to vary the transmission gear ratio of the driving portion of the motor 30b and thereby control the speeds of movement of the X-direction and Y-direction carrier tables 22 and 23 during fine adjustment.

According to the present invention which has the construction and operation as described above, the speeds of movement of the carrier tables during fine adjustment can be arbitrarily set and adjusted and therefore, fine adjustment can be effected at a speed matching the user without resorting to the magnification of the projection lens, and this leads to the effect that film retrieval which is reduced in the sense of fatigue and free of the phenomenon of seasickness can be accomplished.

Figures 17A, 17B:
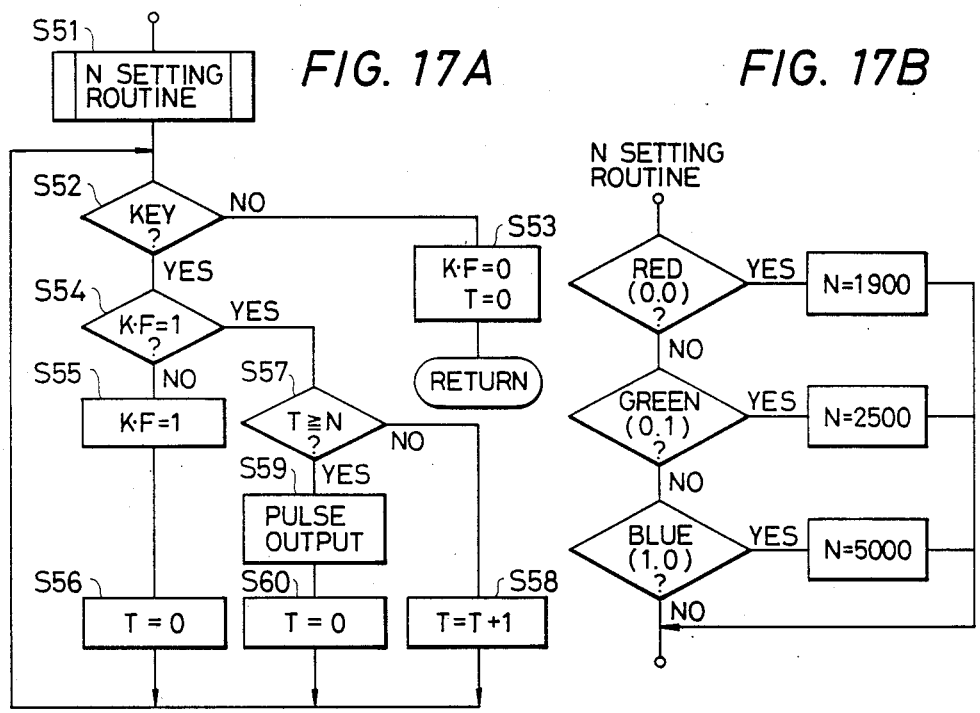
FIG. 17A is a flow chart showing the program executed by the CPU of the keyboard.
FIG. 17B is a flow chart showing the N setting routine of the flow chart of FIG. 17A.
Figure 16:
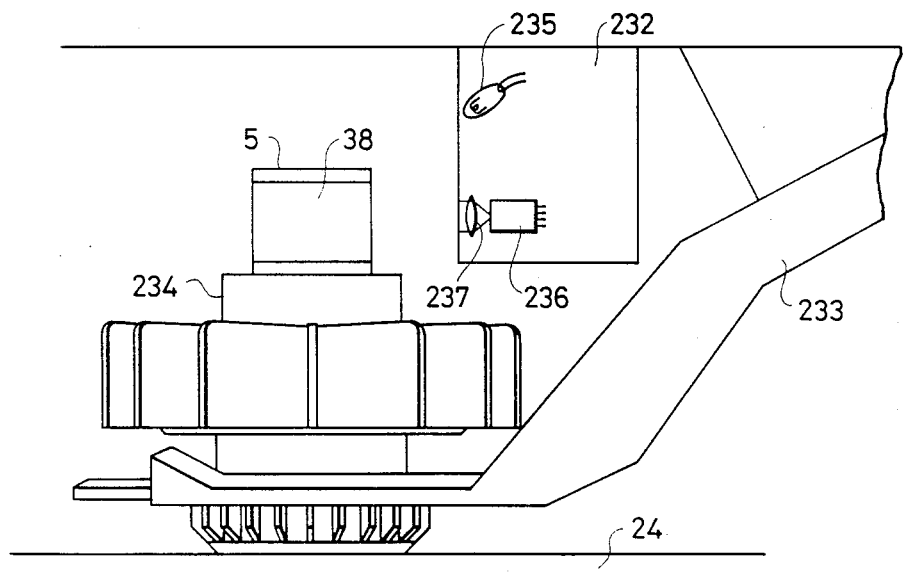
FIG. 16 is a front view showing lens magnification detecting means.
Figure 18A:
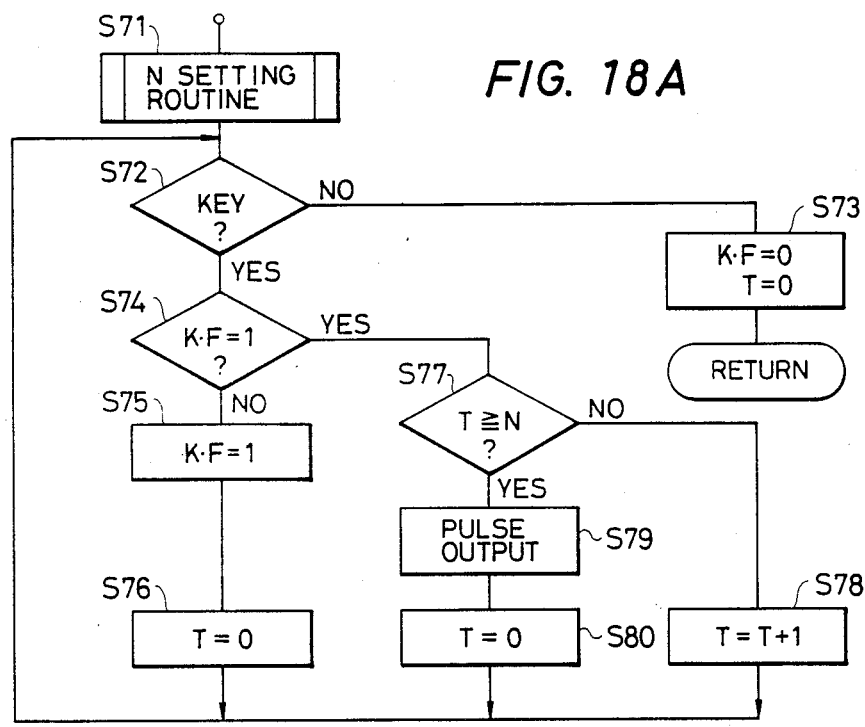
FIG. 18A is a flow chart showing another example of the program executed by the CPU.

FIGS. 16 to 18 show another embodiment for varying the fine speed. FIG. 16 shows magnification detecting means for detecting the projection magnification of images. In this embodiment, it detects the magnification of the lens. Lens magnification detecting means 232 is disposed near a lens holder 234 mounted on the end of a lens interchanging turret 233, and a projection lens 5 is mounted on the lens holder 234. The lens magnification detecting means 232 is provided with a lamp 235, a color sensor 236 and a condensing lens 237. The lamp 235 illuminates a label 238 which is attached to the outer periphery of the projection lens 31 and on which magnification information is recorded in the form of a color code, and the color of this label 238 is detected by the color sensor 236 through the condensing lens 237, whereby the lens magnification information is automatically detected.

That is, the label 238 is colored in red, green, blue or the like, and the lens magnification detecting means 232 detects the color of the label 238 by the color sensor 236 through the condensing lens 237, and supplies to the CPU 118 a lens magnification signal comprising a 2-bit digital signal. For example, the color of the label 238 of the projection lens 5 of magnification 18x is red (0, 0), the color of the label of another projection lens (not shown) of magnification 24x is green (0, 1), and the color of the label of still another projection lens (not shown) of magnification 48x is blue (1, 0). In such a case, in the CPU 118, operation processing is effected in accordance with a pre-incorporated program on the basis of a digital signal (lens magnification signal) corresponding to the color of each label, and the driving pulse put out from the CPU 118 to the driver 30*a* is adjusted, whereby the speeds of movement of the X-direction carrier table 22 and the Y-direction carrier table 23 during the operation of the fine adjustment keys 70–73 on the keyboard 31 are controlled. That is, as shown in FIG. 17(*b*), the timer count number N is set to N=1900 in the case of a lens of magnification 18x, i.e., when the label of the lens is red (0, 0), the timer count number N is set to N=2500 in the case of a lens of magnification 24x, i.e., when the label of the lens is green (0, 1), and the timer count number N is set to N=5000 in the case of a lens of a magnification 48x, i.e., when the label of the lens is blue (1, 0).

The speeds of movement of the carrier tables are determined in the following manner by the CPU 118 serving also as the fine speed control means on the basis of the lens magnification signal from the lens magnification detecting means 232 so that the speed of movement of the image on the screen is substantially constant even if the magnification of the projection lens 5 differs.

That is, when the lens magnification signal is sent from the lens magnification detecting means 232 to the CPU 118, the CPU 118, as shown in the flow chart of FIG. 17, first sets the timer count number N by the lens magnification signal in the N setting routine (step S51). Subsequently, whether the fine adjustment keys 70–73 have been depressed is judged (step S52) and, if those keys are not depressed, the program clears a key flag K.F and a timer variable T and returns (step S53). If the fine adjustment keys 70–73 have been depressed, it is judged whether K.F is 1 (step S54), and in this case, K.F=0 and therefore, K.F is set to K.F=1 (step S55). Subsequently, the program clears the timer variable T (step S56) and returns to step S52. If, at this time, the fine adjustment keys remain depressed, the program proceeds to step S54, and now K.F=1 and therefore, the program proceeds to step S57. At this time, the timer variable T is 0 and therefore, the timer variable T is set to 1, and the program directly returns to step S52. After step S52→step S54→step S57→step S58→step S52 have been repeated several times and the timer variable T has been added in succession, the program proceeds to step S59 only when this timer variable T has become equal to the timer count number N set at step S51. At step S59, a driving pulse is put out from the CPU 118 to the driver 30*a* to move the X-direction carrier table 22 or the Y-direction carrier table 23 in the direction input by the fine adjustment keys. After the timer variable T has been cleared (step S60), step S52→step S54→step S57→step S58→step S52 are again repeated and after the lapse of a predetermined time, a driving pulse is put out from the CPU 118. While the fine adjustment keys 70–73 are depressed, the X-direction carrier table 22 or the Y-direction carrier table 23 is moved in a predetermined direction at the speed of movement determined by the interval of the driving pulse put out from the CPU 118 to the driver 30*a* as described above. This speed of movement, i.e., the interval of the driving pulse, is determined by the timer count number N set correspondingly to the lens magnification signal from the lens magnification detecting means 232. The relation between the lens magnification signal and the timer count number N is pre-input to the ROM (not shown) in the CPU 118 so that the speed of movement is substantially constant independently of the lens magnification.

When the fine adjustment keys 70–73 are depressed as described above, the CPU 118 effects program processing by the lens magnification signal from the lens magnification detecting means 232, adjusts the interval of the driving pulse put out to the driver 30*a* and controls the speeds of movement of the X-direction carrier table 22 and the Y-direction carrier table 23 during fine adjustment so that the speed of movement of the image on the screen is substantially constant independently of the magnification of the projection lens 5.

In the embodiment shown, the lens magnification detecting means 232 has been described as detecting the magnification information of the lens by the color of the label 238 attached to the outer periphery of the projection lens 5, but for example, an encoded cut-away may be provided in the lens itself so as to be detected by a microswitch or the like, or a label printed with a bar code may be attached to the lens so that the lens magnification information may be optically detected and thus, the construction of the lens magnification detecting means 232 may be arbitrarily chosen if it is capable of inputting the magnification of the lens 5.

Also, the embodiment shown has been described with respect to a case where the interval of the driving pulse put out from the CPU 118 to the driver 30*a* is adjusted by the signal from the lens magnification detecting means 232, whereby the speeds of movement of the X-direction and Y-direction carrier tables 22 and 23 during fine adjustment are controlled, but alternatively, design may be made such that the transmission gear ratio of the driving unit is varied by the signal from the lens magnification detecting means 232 to thereby control the speeds of movement of the X-direction and Y-direction carrier tables 22 and 23 during fine adjustment.

According to the present invention which has the construction and operation as described above, the speeds of movement of the carrier tables during fine adjustment are controlled by the lens magnification and therefore, the speed of movement of the image on the screen can be made substantially constant independently of the magnification of the projection lens and alignment of each frame can be accomplished easily and also, the fatigue of eyes or the phenomenon of seasickness can be prevented. Also, even in a case where a projection lens of low magnification is used, the speed of movement of the image on the screen never becomes low, and this leads to various effects including the effect that alignment of each frame can be accomplished within a short time.

In the above-described embodiment, the projection magnification is changed by interchanging the projection lens, but alternatively, the projection magnification of the image may be changed by using a zoom lens or by changing the length of the optical path between the film 1 and the screen 8. Where a zoom lens is used, the magnification is detected by detecting the position of the lens, and where the length of the optical path is changed, the magnification is detected by measuring the length of the optical path.

Description will now be made of an embodiment for controlling the speeds of movement during fine adjustment in conformity with the film form such as the number of frames in the film.

Referring to FIG. 12, film form information input means 332 for inputting the film form information of the film 1 is provided on the keyboard 31. This film form information input means 332 comprises a dip switch disposed on the back portion of the case of the keyboard. The dip switch 332 sends to the CPU 118 a film form signal comprising a 3-bit digital signal as shown in Table 1 below, correspondingly to the film form such as the number of frames in the film. In the CPU 118, operation processing is effected in accordance with a pre-incorporated program on the basis of the film form signal, and the driving pulse put out from the CPU 118 t the driver 30a is adjusted, whereby the speeds of movement of the X-direction carrier table 22 and the Y-direction carrier table 23 during the operation of the fine adjustment keys 70–73 are controlled.

Figure 18B:
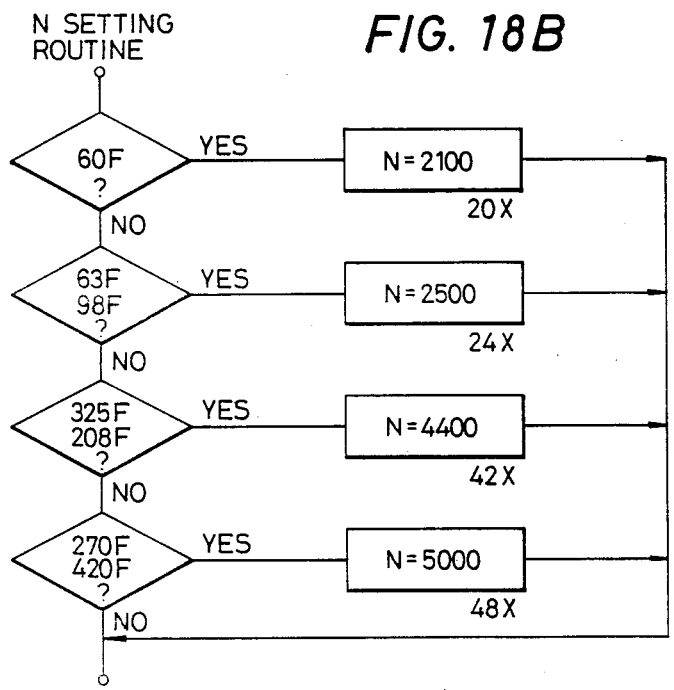
FIG. 18B is a flow chart showing the N setting routine of the flow chart of FIG. 18A.

That is, as shown in FIG. 18B, when the number of frames 60F (0, 0, 1) is set, the timer count number N is set to N=2100 because the reduction rate is 20x; when the numbers of frames 63F (0, 0, 0) and 98F (1, 0, 1) are set, the timer count number N is set to N=2500 because the reduction rate is 24x; when the numbers of frames 325F (0, 1, 1) and 208F (1, 0, 0) are set, the timer count number N is set to N=4400 because the reduction rate is 42x; and when the numbers of frames 270F (0, 1, 0) and 420F (1, 1, 0) are set, the timer count number N is set to N=5000 because the reduction rate is 48x.

TABLE 1

| bit 2 | bit 1 | bit 0 | Number of frames | Reduction rate | Fine speed* |
|---|---|---|---|---|---|
| 0 | 0 | 0 | 63F | 24x | 2 |
| 0 | 0 | 1 | 60F | 20x | 2.4 |
| 0 | 1 | 0 | 270F | 48x | 1 |
| 0 | 1 | 1 | 325F | 42x | 1.14 |
| 1 | 0 | 0 | 208F | 42x | 1.14 |
| 1 | 0 | 1 | 98F | 24x | 2 |
| 1 | 1 | 0 | 420F | 48x | 1 |

*The fine speed is a relative speed with 48x as 1.

When a film form signal is sent from the film form information input means 232 to the CPU 118 shown in FIG. 11, the CPU 118 first sets the timer count number N by the film form signal in the N setting routine, as shown in FIG. 18 (step S71). Subsequently, whether the fine adjustment keys 70–73 have been depressed is judged (step S72), and if the fine adjustment keys 70–73 are not depressed, the program clears the key flag K.F and the timer variable T and returns (step S73). If the fine adjustment keys 70–73 have been depressed, it is judged whether K.F is 1 (step S74), and in the case, K.F=0 and therefore, the key flag K.F is set to K.F=1 (step S75). Then, the program clears the timer variable T (step S76) and returns to step S72. If, at this time, the fine adjustment keys remain depressed, the program proceeds to step S74, and now K.F=1 and therefore, the program proceeds to step S77. At this time, the timer variable T is 0 and therefore, the timer variable T is set to 1 and the program directly returns to step S72. Step S72→step S74→step S77→step S78→step S72 are repeated several times and the timer variable T is added in succession, whereafter the program proceeds to step S79 only when the timer variable T has become equal to the timer count number N set at step S71. At step S79, a driving pulse is put out from the CPU 118 to the driver 30a to move the X-direction carrier table 22 or the Y-direction carrier table 23 in the direction input by the fine adjustment keys. The timer variable T is cleared (step S80), whereafter step S72→step S74→step S77→step S78→step S72 are again repeated, and after the lapse of a predetermined time, a driving pulse is put out from the CPU 118. While the fine adjustment keys 70–73 are depressed, the X-direction carrier table 22 or the Y-direction carrier table 23 is moved in a predetermined direction at a speed of movement determined by the interval of the driving pulse put out from the CPU 118 to the driver 30a as described above. This speed of movement, i.e., the interval of the driving pulse, is determined by the timer count number N set correspondingly to the film form signal from the film form information input means 232. The relation between the film form signal and the timer count number N is pre-input t the ROM (not shown) in the CPU 118 so that the speed of movement is substantially constant independently of the film form.

When the fine adjustment keys 70–73 are depressed as described above, the CPU 118 effects program processing by the film form signal from the film form information input means 232, adjusts the interval of the driving pulse put out to the driver 30a, and controls the speeds of movement of the X-direction carrier table 22 and the Y-direction carrier table 23 during fine adjustment so that the speed of movement of the image on the screen is substantially constant independently of the film form.

The embodiment shown has been described with respect to a case where a dip switch for inputting a digital signal in conformity with the film form is used as the film form information input means 232, whereas this is not restrictive, but alternatively, panel information may be input by a key on the keyboard 31, or use may be made of means of any structure which can input the film form information to the CPU 118.

Also, the embodiment shown has been described with respect to a case where the interval of the driving pulse put out from the CPU 118 to the driver 30a is adjusted by the signal from the film form information input means 232, whereby the speeds of movement of the X-direction and Y-direction carrier tables 22 and 23 during fine adjustment are controlled, but alternatively, design may be made such that the CPU 118 is operated by the signal from the film form information input means 232 to thereby vary the transmission gear ratio of drive means 15 provided with a motor and control the speeds of movement of the X-direction and Y-direction carrier tables during fine adjustment.

According to the present invention which has the construction and operation as described above, the speeds of movement of the carrier tables during fine adjustment are controlled by the film form and therefore, the speed of movement of the image on the screen can be made substantially constant independently of the magnification of the projection lens interchanged depending on the film form and alignment of each frame can be accomplished easily and also, the fatigue of eyes or the phenomenon of seasickness can be prevented. Also, even in a case where a projection lens of low magnification is used, the speed of movement of the image on the screen never becomes low, and this leads to various effects including the effect that alignment of each frame can be accomplished within a short time.

What is claimed:

1. An apparatus for retrieving a desired frame in micro-fiche having a plurality of frames arranged in rows and columns, comprising:
   optical means for projecting an image recorded on a frame placed at a projection position;
   a carrier for holding the micro-fiche, said carrier being movable in horizontal and vertical directions with respect to the projection position;
   moving means for moving said carrier;

detecting means for detecting whether or not an image is present on the frame of the micro-fiche; and control means connected to said detecting means for controlling said moving means such that when said detection means detects that an image is present on a frame of a selected row or column, said carrier may be stopped for a set period of time, and when said detection means detects that no image is present on the frame, a top frame in the next row or column may be placed at the projection position.

2. An apparatus according to claim 1, wherein said control means inhibits the stopping of said carrier until said detecting means detects a frame in which an image is present.

3. An apparatus according to claim 1, wherein said control means causes said moving means to move said carrier before the expiration of the set period of time after the stopping of said carrier when said detecting means detects a frame in which an image is not present.

4. An apparatus according to claim 1, wherein said carrier has a transparent plate which is openable to insert the micro-fiche.

5. An apparatus according to claim 1, wherein said control means controls said carrier to move a predetermined amount and then stop after the beginning of the movement of said carrier when said detecting means detects the presence of image.

6. An apparatus according to claim 1, wherein said control means stops said carrier for the set period of time each time said carrier has been moved for a length which is equal to the sum of the length of a frame of the micro-fiche in the direction of the movement of said carrier and the length of the image-free part of the micro-fiche between the frames.

7. An apparatus according to claim 1, further comprising:

inputting means for inputting a signal into said moving means for causing said moving means to intermittently move said carrier, and wherein the signal causes said control means to actuate said moving means to intermittently move said carrier for a set length.

* * * * *

UNITED STATES PATENT AND TRADEMARK OFFICE
CERTIFICATE OF CORRECTION

PATENT NO. : 4,981,351
DATED : January 1, 1991
INVENTOR(S) : Makoto Endo

It is certified that error appears in the above-identified patent and that said Letters Patent is hereby corrected as shown below:

On the title page:

[73] Assignee:

"Canon Kabushiki Kaishi," should read
--Canon Kabushiki Kaisha,--.

[56] References Cited:

Under "U.S. PATENT DOCUMENTS",

Col. 1, "4,033,884    7/1977    Toriumi et al."
        should read
        --4,033,684    7/1977    Toriumi et al.--.

Col. 2, "4,549,797    10/1985    Sawanto et al."
        should read
        --4,549,797    10/1985    Sawano et al.--.

Signed and Sealed this

Fifth Day of November, 1991

*Attest:*

HARRY F. MANBECK, JR.

*Attesting Officer*     *Commissioner of Patents and Trademarks*